(12) United States Patent
Barbeau (10) Patent No.: US 7,142,244 B1
(45) Date of Patent: Nov. 28, 2006

(54) DIGITAL CAMERA WITH INTEGRATED CABLE STORAGE

(75) Inventor: Pierre C. Barbeau, Leawood, KS (US)

(73) Assignee: Sprint Spectrum L.P., Overland Park, KS (US)

(*) Notice: Subject to any disclaimer, the term of this patent is extended or adjusted under 35 U.S.C. 154(b) by 706 days.

(21) Appl. No.: 10/293,842

(22) Filed: Nov. 13, 2002

Related U.S. Application Data (63) Continuation of application No. 10/230,693, filed on Aug. 29, 2002, now abandoned.

(51) Int. Cl.
*G03B 17/02* (2006.01)
*H04N 5/225* (2006.01)

(52) U.S. Cl. ............... 348/373; 348/207.1; 396/535

(58) Field of Classification Search ......... 348/207.1, 348/207.2, 211.4, 211.14, 333.07, 373, 375, 348/376; 396/424, 535, 540
See application file for complete search history.

(56) References Cited

U.S. PATENT DOCUMENTS

| | | | | |
|---|---|---|---|---|
| 4,752,792 A | * | 6/1988 | Keith | 396/425 |
| 5,281,988 A | * | 1/1994 | Martin | 396/59 |
| 5,321,456 A | * | 6/1994 | Yoon | 396/383 |
| 6,181,883 B1 | * | 1/2001 | Oswal | 396/429 |
| 6,424,551 B1 | * | 7/2002 | Lin | 363/146 |
| 6,452,626 B1 | * | 9/2002 | Adair et al. | 348/158 |
| 6,498,598 B1 | * | 12/2002 | Watanabe | 345/156 |
| 6,612,495 B1 | * | 9/2003 | Reddersen et al. | 235/462.15 |
| 6,641,010 B1 | * | 11/2003 | Greene | 224/265 |
| 6,909,259 B1 | * | 6/2005 | Chung | 320/107 |
| 6,950,142 B1 | * | 9/2005 | Soumi et al. | 348/375 |
| 6,964,576 B1 | * | 11/2005 | Crutchfield | 439/142 |

FOREIGN PATENT DOCUMENTS

| | | | |
|---|---|---|---|
| EP | 118145 A1 | * | 9/1984 |
| JP | 04088700 A | * | 3/1992 |
| JP | 09116283 A | * | 5/1997 |
| JP | 2005091700 A | * | 4/2005 |

* cited by examiner

*Primary Examiner*—David Ometz
*Assistant Examiner*—John M. Villecco (57) ABSTRACT

A digital camera apparatus wherein the cable used to link the camera to a processing device is stored within the body of the camera. The camera includes a cover associated with the camera housing that together define a storage cavity. The storage cavity is adapted to receive at least a portion of a cable and an associated connector. The cover, when closed, protects the connector and the portion of the cable against damage. When the cover is opened the connector is freely accessible to the user. The connector is compatible with a processing device and the cable communicatively couples the connector to the data storage mechanism, allowing files stored on the camera's data storage mechanism to be transfer to the processing device.

11 Claims, 5 Drawing Sheets

DIGITAL CAMERA WITH INTEGRATED CABLE STORAGE

FIELD OF THE INVENTION

The present invention relates to an apparatus for digital imaging, more particularly to a digital camera that includes integral cable storage.

BACKGROUND OF THE INVENTION

Digital cameras have become very popular in recent years. A digital camera has many advantages over traditional film cameras. These advantages include: (1) being able to instantly view the picture; (2) being able to delete pictures of inferior quality; (3) recording the image in digital form allowing it to be manipulated on a computer; (4) the ability to transmit the pictures to others electronically; and (5) the ability to print photo quality pictures at home. However, to fully take advantage of these qualities it is often necessary to transfer the image file from the camera to a processing device that allows manipulation and/or communication of the file. Such transfer requires that the camera and the processing device to be linked. Most often this link is accomplished with a cable. As a result, a user has to have access to a cable to fully utilize the qualities of the camera.

Most digital cameras provide a linking cable as an accessory. The cable is provided with connectors at both ends—one to connect to a port on the camera and the other to connect to a port on the processing machine, i.e., the computer, cellular phone or personal digital assistant ("PDA"). The problem with such an arrangement is that if the user wishes to download from the camera in a remote location, then an accommodation has to be made to carry the cable in a carrying case or some other vehicle. Moreover, it is easy to forget or misplace the cable thereby limiting the capabilities of the camera when the cable is unavailable.

At the same time, modern telecommunications systems have enabled a great deal of consumer mobility. Consumers may travel throughout local areas or across long distances and yet remain in communication with others via wireless or landline telephones, e-mail, instant messaging, audio and video conferencing, and other facilities. Cellular wireless is an increasingly popular means of personal communication in the modern world. People are using cellular wireless networks for the exchange of voice and data over cellular telephones, PDAs, cellular telephone modems, and other devices. This exchange of information over wireless networks is only improving and increasing. With the advent of third generation wireless networks, so called Wideband Code Division Multiple Access (WCDMA) networks, the case of communicating information, including images, over these networks will become increasing more important. In such an environment it is advantageous to be able to transmit images from a digital camera over a wireless network. However, if the user is unable to get the information onto the network, because of no access to the appropriate linking cable, the capabilities of the wireless network are of no use.

SUMMARY OF THE INVENTION

The present invention relates to a digital camera apparatus wherein the cable used to link the camera to a processing device is stored within the body of the camera. According to an exemplary embodiment, the invention is directed to a digital camera that includes a camera housing. The housing defines a storage surface, a camera cavity and a lens opening into the camera cavity. A lens is disposed within the lens opening. The lens receives light defining images that are stored as digital files on a data storage mechanism, located within the camera cavity and communicatively coupled to the lens. A cover is joined to the camera housing and has a first operable state and a second operable state. The cover substantially encompasses the storage surface in the first operable state, and exposes the storage surface in the second operable state. Together the cover and the storage surface define a storage cavity. The storage cavity is adapted to receive at least a portion of a cable and an associated connector. When the cover is in first operable state and at least a portion of the cable and the associated connector are in the storage cavity, the cover protects the connector and the portion of the cable against damage. Conversely, when the cover is in its second operable state the connector is freely accessible. The connector is compatible with a processing device and the cable communicatively couples the connector to the data storage mechanism. In one embodiment the cable extends through the camera housing into the camera cavity.

In another exemplary embodiment of the invention a digital camera includes integrated connector-cable storage compartment. The camera comprises a camera housing having a wall structure defining an outer surface, a first enclosure and a lens opening. A lens is disposed within the first enclosure at the lens opening, for receiving light defining images. A data storage mechanism is also disposed within the first enclosure and stores digital representations of the images as a digital file. The camera also includes a cover having a closed state and an open state, wherein, in the closed state the cover substantially encompasses a given portion of the wall structure so that the cover and the given portion cooperatively define a second enclosure between the cover and the given portion. A connector-cable extends from an origination point on the wall structure to a distal end, the distal end having a connector for coupling the digital camera with a processing device. When the connector-cable is in a stored-state at least a portion of the connector-cable, including the connector, is stored within the second enclosure. When the connector cable is in its accessible state, i.e., not stored within the second enclosure, it extends out from the origination point and is connectable to the processing device. The connector-cable is switched from the stored state to the accessible state by moving the cover from the closed state to the open state and thereby rendering accessible at least the distal end of the connector-cable.

In a further exemplary embodiment of the invention a digital camera comprises a camera housing that defines a camera portion, a connector-cable storage portion, and a removable cover over the connector-cable storage portion. The removable cover has at least two states, an open state in which the connector-cable storage portion is exposed, and a closed state in which the connector-cable storage portion is covered. The camera further includes a connector-cable for coupling the digital camera with a processing device, wherein the digital camera has (i) a first state in which the connector-cable is at least partially stored within the connector-cable storage portion and the cover is in the closed state, (ii) a second state in which the connector-cable is at least partially stored within the connector-cable storage portion and the cover is in the open state, (iii) a third state in which the connector-cable is removed from the connector-cable storage portion and the cover is in the open state, and (iv) a fourth state in which the connector-cable is removed from the connector-cable storage portion and the cover is in the closed state.

In each of these exemplary embodiments it may be advantageous to include a feature where the connector-cable is permanently attached to the camera and passes through the camera housing. Advantageously it may pass through the housing at a surface within the cable storage compartment. Alternatively, it may pass through the housing outside the cable storage compartment. In such a case, the camera is advantageously provided with a channel or groove from the point at which the cable passes through the camera housing to the cable storage compartment. The channel is adapted to receive a portion of the cable when the cable is stored in the cable storage compartment.

It will be understood that the cover can be associated with the camera housing in many ways known to those skilled in the art that allow it to move between its various states. Exemplary of such a connection is a hinge. A hinge has the advantage of remaining connected to the camera housing and thereby reducing the possibilities that it will be lost or separated from the camera itself. The hinge could take on many forms including a spring loaded hinge. In addition, the cover may advantageously include a latch mechanism to securely close the cover. Such latch mechanisms are well known to those in the art.

These as well as other features and advantages of the present invention will become apparent to those of ordinary skill in the art by reading the following detailed description, with appropriate reference to the accompanying drawings.

DESCRIPTION OF FIGURES

An exemplary embodiment of the present invention is described herein with reference to the drawings, in which.

DETAILED DESCRIPTION OF AN EXEMPLARY EMBODIMENT

Figure 1:
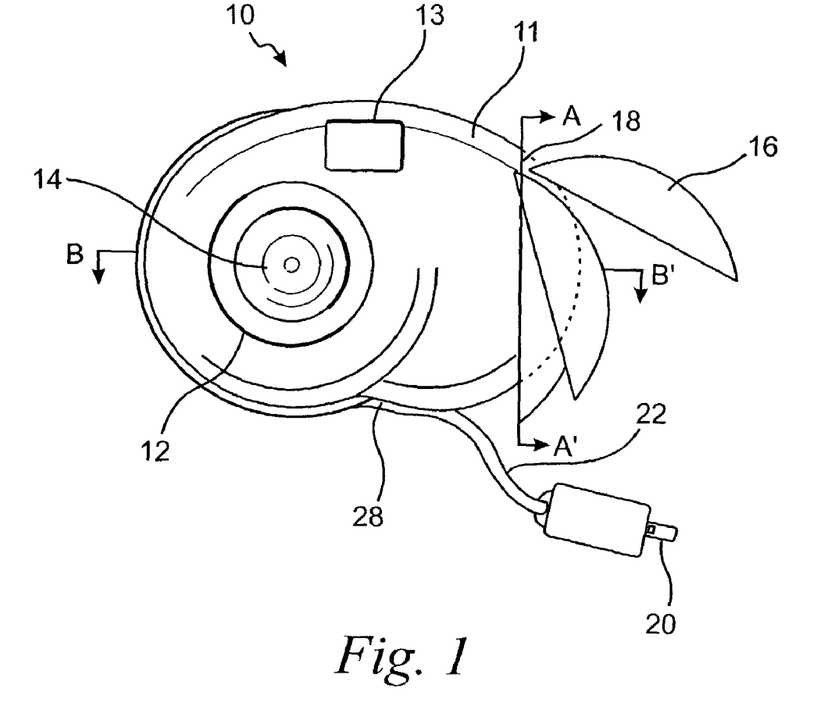
FIG. 1 is a front view of an exemplary embodiment of the digital camera of the present invention illustrating the relationship of the camera housing, the connector-cable and the cover.

An exemplary embodiment of the digital camera of the present invention is shown in FIG. 1. As can be seen the digital camera includes a camera housing 10. The camera housing 10 may be of any appropriate shape as defined by its outer wall 11. The outer wall 11 defines a first enclosure or camera cavity 36 (see FIG. 8). The outer wall 11 further defines a lens opening 12 that passes from the exterior of the wall 11 and into the first enclosure 36. The lens opening 12 is adapted to allow a lens 14 to pass through the opening 12. Optionally, the outer wall 11 is also adapted for a view finder 13. Advantageously, the view finder 13 would pass entirely through the outer wall 11 and the first enclosure, allowing the user to see through the camera housing 10 from the back when taking a picture.

The lens 14 is adapted to receive light which is representative of an image. Such lenses are well known in the art and in wide use in digital cameras. The camera then converts the image received by the lens 14 into a digital file. Again such a conversion is well known in the art. The file may be of any appropriate format. Examples of such file format include "jpg," "gif" and "tif". These files are stored on a data storage mechanism 32 located within the first enclosure 36 defined by the outer wall 11. The data storage mechanism 32 may be any appropriate system for storing digital data. This could include both magnetic and optical storage media. Examples of such storage mechanism include random access memory (RAM) chips, memory cards, memory sticks, and optical discs.

Figure 9:
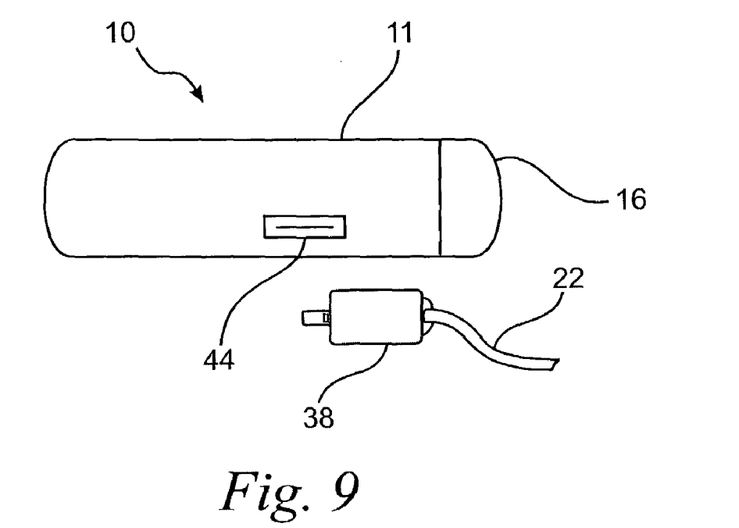
FIG. 9 is a bottom view of another embodiment of the of the present invention illustrating a removable cable and associated port.

The invention further includes a cable 22 and an associated connector 20 located at the distal end of the cable 22. The cable 22 and the connector 20 may be a single unit, i.e. permanently joined, or separate units. They must, however, be capable of being communicatively coupled. For purposes of clarity, the term "cable-connector" when used herein refers to a structure wherein the cable 22 and the connector 20 are a single unit. The proximal end of the cable 22 is communicatively attached to the camera. In particular the cable 22 is capable of being functionally associated with the data storage mechanism 32 such that stored files can be communicated over the cable 22. This association may be effected in any appropriate manner. In one exemplary embodiment the cable 22 passes through the outer wall 11 and is operatively attached to the data storage mechanism 32. In another exemplary embodiment, shown in FIG. 9, the cable 22 may have second connector 38 located at its proximal end. This second connector 38 is adapted to be connected to the camera, for example at port 44, to effectuate a communicative attachment to the data storage mechanism 32. In this manner the camera is capable of transferring the files stored in the data storage mechanism 32 through the cable 22.

The connector 20 at the distal end of the cable 22 may take any appropriate form. The form is often dictated by the intended use of the connector 20 and the nature of the processing device intended to be used in conjunction with the camera. Without intending to limit the scope of the invention, examples of appropriate connector include a USB connector, an IEEE 1394 connector and an RS-232 connector.

Figure 2:
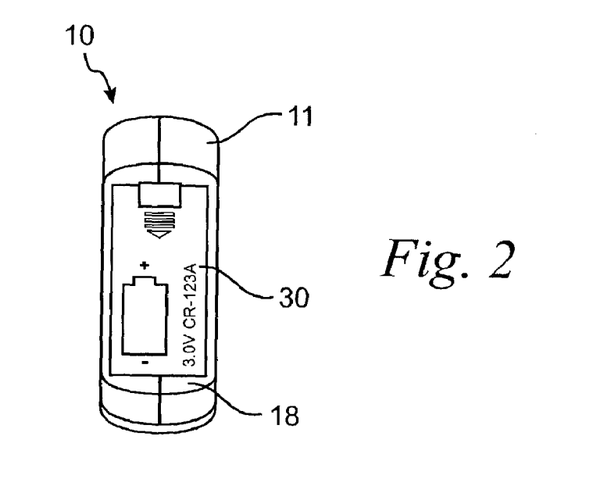
FIG. 2 is a cross section along axis A-A' of FIG. 1 illustrating the surface that is enclosed by the cover.
Figure 6:
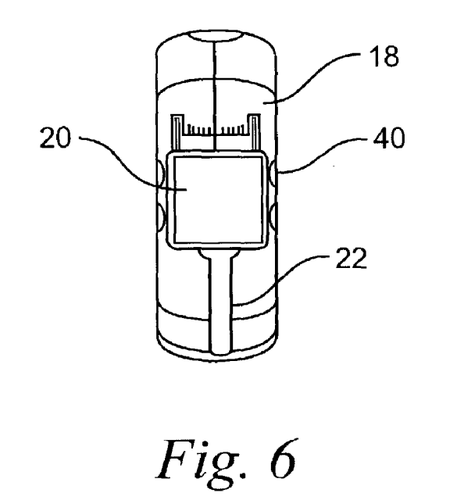
FIG. 6 is a side view of an exemplary embodiment of the present invention with the cover removed illustrating the connector in the stored position.

Referring to FIG. 1 and FIG. 2, it will be seen that the outer wall 11 of the camera housing 10 further defines a storage surface 18. The storage surface 18 is advantageously planar. It may, however, also be of a concave or convex configuration to meet the storage application. Advantageously the storage surface 18 includes fixtures 40 (See FIG. 6) that interact with the connector 20 to removeably secure the connector 20 to the storage surface 18. As shown in FIG. 2, the storage surface 18 may also be used to provide access to the first enclosure 36 defined by the outer wall 11. Specifically, an access panel 30 may be provided to allow the user to access the first enclosure 36 for such purposes as replacing the batteries.

Figure 3:
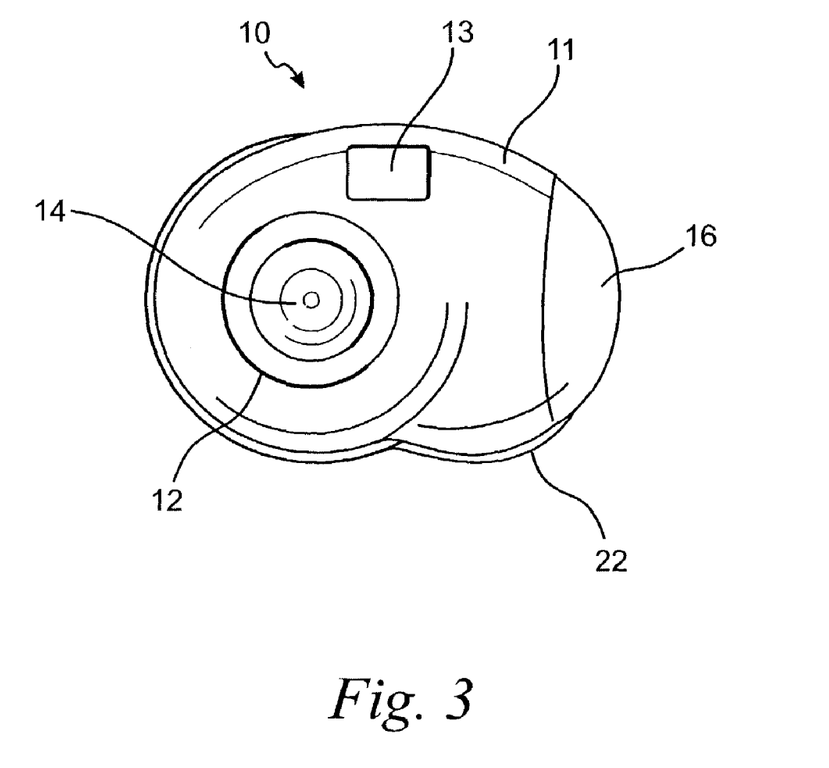
FIG. 3 is a front view of an exemplary embodiment of the digital camera of the present invention with the cover in the closed position.

Associated with the storage surface 18 is a cover 16. In an exemplary embodiment the cover 16 has two principle states—a first state wherein it is closed blocking full access to the storage surface 18 (see FIG. 3) and a second state wherein it is open allowing full access to the storage surface 18. These two states of the cover 16 and a transition state between the two are illustrated in shadow lines in FIG. 4. Advantageously the cover 16 is shaped to compliment the shape of the outer wall 11 such that when the cover 16 is in its first state its outer surface is substantially continuous with the outer surface of the outer wall 11.

Figure 8:
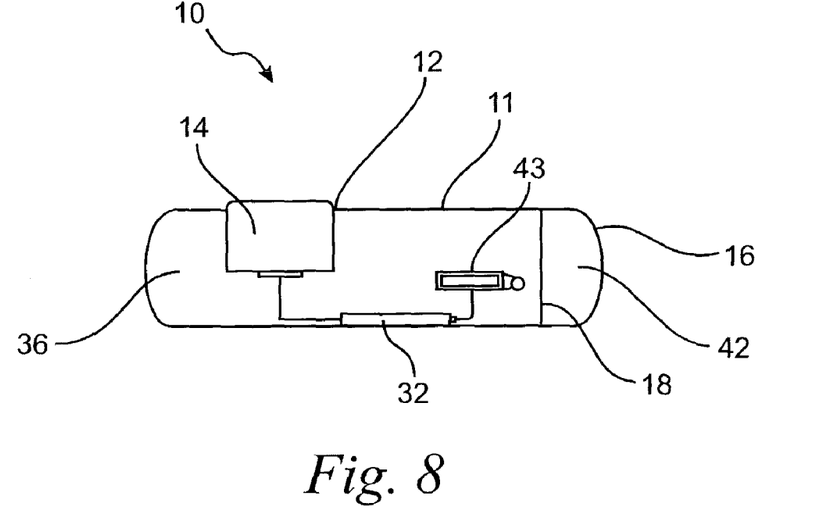
FIG. 8 is a cross section along axis B-B' of FIG. 1 illustrating in a simplified block fashion the relevant interior of an embodiment of the digital camera of the present invention.

As can be seen in the first state, the cover 16 in conjunction with the storage surface 18 define a second enclosure or storage cavity 42 (see FIG. 8). This second enclosure 42 is adapted to receive the connector 20 and at least a portion of the cable 22. Thus, this second enclosure 42 provides a location for storage of the connector 20 and at least a portion of the cable 22 when they are not in use.

Figure 4:
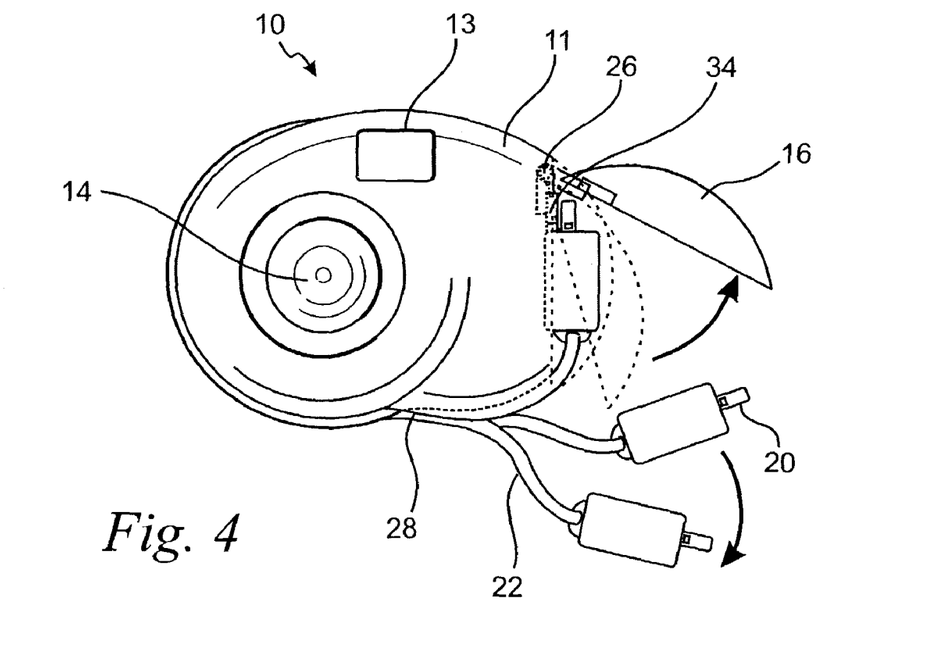
FIG. 4 is another front view of an exemplary embodiment of the digital camera of the present invention illustrating the operation of the cover in conjunction with the cable connector.

The cover 16 is connected to the outer wall 11 in manner that allows it to move between its various states. Any appropriate manner of connection is acceptable. Advantageously the cover 16 is connected to the outer wall 11 by way of a hinge 26. An exemplary hinge 26 is illustrated in FIG. 4. The hinge 26 allows the cover 16 to swing between its first state and its second state. The hinge 26 may be located in any appropriate position, in the example of FIG. 4 it is advantageously located on the upper portion of the cover 16. In addition, the hinge 26 may be associated with a biasing mechanism. The biasing mechanism may urge the cover 16 into either its first state or its second state. The hinge 26 of FIG. 4 illustrates a biasing mechanism that urges the cover 16 into its second state, i.e. in the open position. Specifically, the hinge 26 includes a spring 34 that urges the cover 16 into an open position. When the cover 16 is closed, the spring 34 is compressed. The cover 16 is held in its first state by a latch mechanism. As illustrated in FIG. 4, the latch mechanism is engaged by moving the cover 16 upward when the spring 34 on the hinge 26 is compressed. This latch mechanism inhibits the cover from moving from the first state to the second state. Conversely, to release the latch mechanism, the cover 16 is pulled down thereby allowing the cover 16 to freely swing to the second state. Other latching mechanisms are well known in the art. The present mechanism is only provided as an exemplary illustration of the invention.

Figure 5:
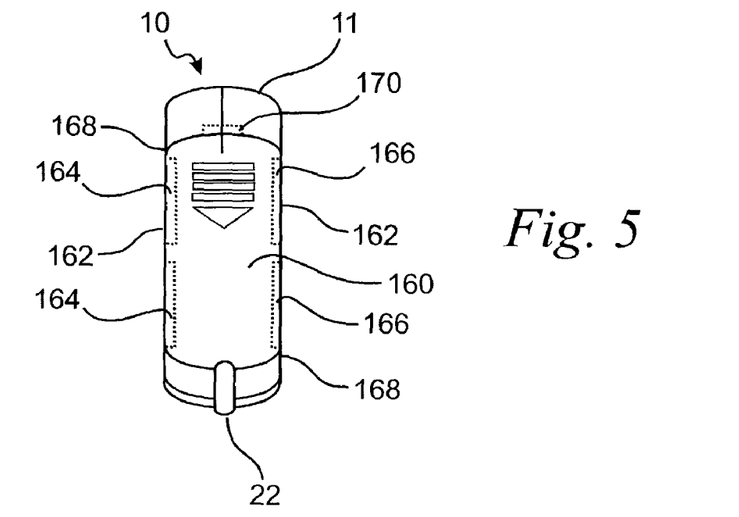
FIG. 5 is a side view of another exemplary embodiment of the present invention with sliding version of the cover shown in the closed position.

FIG. 5 illustrates an alternative embodiment of the cover 160. The cover 160 differs from the cover 16 in that it is not attached to the outer wall 11 by a hinge. Rather, the cover 160 slidably engages the outer wall 11 and is capable of being completely detached from the outer wall 11. Such slidable engagement can be accomplished is many way well known in the art. In the exemplary embodiment shown in FIG. 5 the cover 160 is formed to mate with the other wall 11. Specifically, the edges 162 of the cover 160 are formed to slidably engage the edges 168 of the storage surface 18. This mating can be done in any way, many of which are well known in the art. One example is that the cover 160 defines a rail 164 (shown in shadow) along each of its edges 162. These rails 164 are adapted to fit into grooves 166 (shown in shadow) on opposite edges 168 of the storage surface 18. The cover 160 also defines a locking tab 170 (shown in shadow) at one end. A plurality of locking tabs 170 may be used if appropriate. The locking tab 170 is positioned to resiliently engage a receiving slot (not shown) defined by the outer wall 11. When the locking tab 170 resiliently engages the receiving slot, the cover 160 is secured in a closed position. The cover 160 opened by sliding the tongue rails 164 in the grooves 166 with sufficient force to overcome the resilient forces holding the locking tab 170 in the receiving slot. When the locking tab 170 is disengaged from the receiving slot and the rails 164 are disengaged from the grooves 166, the cover 160 may be removed from the outer wall 11. It is reattached by simply reversing the process. Of course, other methods of removably securing the cover 160 to the outer wall 11 may be used without varying from the scope and spirit of the invention.

Figure 7:
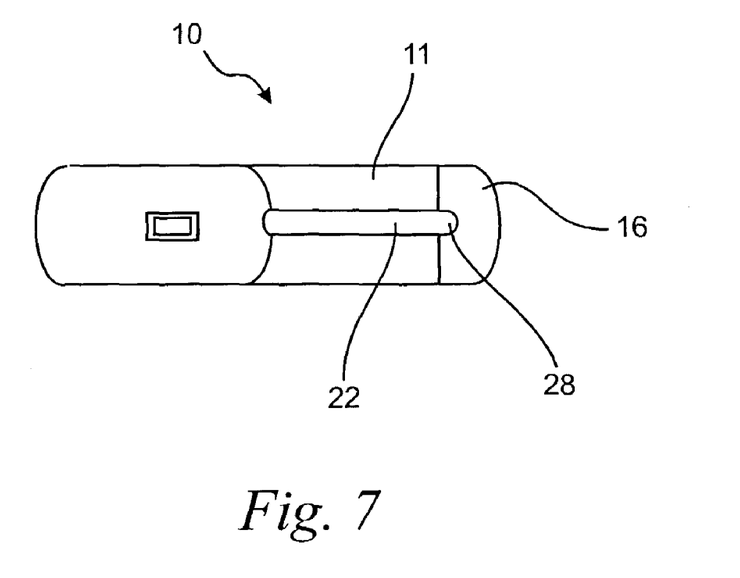
FIG. 7 is a bottom view of an exemplary embodiment of the present invention with the cover in the closed position.

As noted above the cable 22 can interface with the camera in various ways and at various locations. FIGS. 1 and 4 illustrate an embodiment with a unitary cable 22 and connector 20 structure. The proximal end of the cable 22 passes through the outer wall 11 remote from the second enclosure defined by the storage surface 18 and the cover 16. A channel 28 leads from the point the cable 22 passes through the outer wall 11 to the second enclosure. The channel 28 is adapted to receive a portion of the cable 22 and removably secure it against the outer wall 11. FIG. 7 illustrates the cable 22 removably secured in the channel 28. This is particularly the case when the connector 20 and at least a portion of the cable 22 are stored in the second enclosure.

Thus, it can be seen that the cable 22 can be in a stored state or an accessible state. In the stored state the connector 20 and at least a portion of the cable 22 are located in the second enclosure 42 defined by the cover 16 and the storage surface 18. In the stored state the cover 16 will be in its first state thereby making the connector 22 and at least part of the cable 20 inaccessible without altering the state of the cover 16. The cable 22 is moved from the stored state to the accessible state by moving the cover 16 from the first state to the second state. The cable 22 is then fully accessible and can be removed from the storage surface 18. The cable 22 may also be removed from the channel 28. Advantageously, the cover 16 may be moved back to the first state when the cable 22 is in its accessible state, making the cable 22 available when the cover 16 is closed.

In another embodiment of the invention the cable 22 passes through the outer wall 11 of the camera housing 10 at the storage surface 18. In this embodiment there is no need for a channel 28. However, the cover 16 is adapted to allow the cable 22 to pass through when the cable 22 is in an accessible state. As an example the cover 16 may be adapted to include a notch through which the cable 22 may pass when the cover 16 is in its first state (closed) and the cable 22 is in its accessible state.

The connector 20 is adapted to communicatively connect with a processing device. Examples of processing devices are a computer, a PDA, and a cellular phone but other devices may also be used. The file representing the image may then be transfer from the data storage mechanism 32 of the camera to the processing device across the combination of the cable 22 and the connector 20. The processing device may then further process the file including communicating the file to a different location.

As an additional feature to the above embodiments of the invention the cable 22 may also be associated with a retractable reel 43 (shown in FIG. 8) within the camera housing 10. In this manner a major portion of the cable 22 could be retracted into the camera housing and stored on a retractable reel 43. The connector 24 and the remaining unretracted portion of the cable 22 may be stored within the second enclosure 42 defined by the storage surface 18 and the cover 16.

Capturing images with the camera of the present invention is done in a conventional manner well known in the art. The lens 14 captures the image that is the subject of the picture. That image is stored in the data storage mechanism 32 as a digital file. As with conventional digital cameras multiple image files may be stored on the data storage mechanism 32. When taking pictures, the camera will most often be in the state illustrated in FIG. 3. Specifically, the cover 16 is in its first state (closed) with the connector 20 and at least a portion of the cable 22 stored in the second enclosure or storage cavity. When the user wishes to transfer the files stored on the data storage mechanism 32 to a processing device, the cover 16 is opened and put in its second state. The connector 20 and the cable 22 are removed from storage surface 18 so they can be put into a communicative relationship with the processing device. In one example, the connector 20 on the distal end of the cable 22 is attached to a compatible port (for example a USB port) on a computer. The image stored on the data storage mechanism 32 can then be transferred to the memory device of the computer through use of the appropriate software. Software for such applications is widely available and may vary with the hardware.

In another application, the connector 20 is attached to the input port on a cellular phone. In a similar fashion the files on the data storage mechanism 32 can be transferred to the memory in the phone. The image file can then advantageously be transmitted via a wireless network to a remote location. Such an application readily allows for rapid viewing of an image by individuals in the remote location.

An exemplary embodiment of the present invention has been illustrated and described. Those skilled in the art will understand, however, that changes and modifications may be made to the invention without deviating from the scope of the invention, as defined by the following claims. Further, the claims should not be read as limited to the described order of elements unless stated to that effect.

I claim:

1. A digital camera with integrated cable storage comprising:
    a camera-housing having a wall structure defining (i) an outer surface, and (ii) a first enclosure;
    a cover having a closed state and an open state, wherein, in the closed state, the cover substantially encompasses a given portion of the wall structure so that the cover and the given portion cooperatively define a second enclosure between the cover and the given portion;
    a cable extending from an origination point on the wall structure to a distal end, the distal end having a connector for coupling the digital camera with a processing device wherein the origination point is external to the given portion of the wall structure substantially encompassed by the cover,
    wherein the cable has a stored-state in which at least a portion of the cable, including the connector, is stored within the second enclosure, and an accessible state in which the cable extends out from the origination point and is not stored within the second enclosure;
    wherein, when the cover is in the closed state and the cable is in the stored state, the cable extends from the origination point, into the second enclosure;
    wherein, in the accessible state, the connector is connectable to the processing device; and
    wherein, the cable is switched from the stored state to the accessible state by moving the cover from the closed state to the open state and thereby rendering accessible at least the distal end of the connector-cable.

2. The digital camera of claim 1, wherein the cover is connected by a hinge to the wall structure, and the cover rotates about the hinge between the open state and the closed state.

3. A digital camera comprising:
    a camera-housing defining a camera portion, and a cable-connector storage portion, the cable-connector storage portion being defined by a cable-connector storage surface of the camera portion and a removable cover;
    the cover having an open state in which the cable-connector storage surface is exposed, and a closed state in which the cable-connector storage surface is covered; and
    a cable-connector for coupling the digital camera with a processing device wherein the cable-connector comprises (i) a cable portion extending from a proximal end to a distal end (ii) a first connector at the distal end for connecting with the processing device and (iii) a second connector at the proximal end, wherein, the connector-cable is fully removable from the digital camera, and the second connector is connectable with a port on the digital camera,
    wherein the digital camera has (i) a first state in which the cable-connector is at least partially stored within the storage portion and the cover is in the closed state, (ii) a second state in which the cable-connector is at least partially stored within the storage portion and the cover is in the open state, (iii) a third state in which the cable-connector is removed from the storage portion and the cover is in the open state, and (iv) a fourth state in which the cable-connector is removed from the storage portion and the cover is in the closed state;
    such that when the first connector is connected with the processing device and the second connector is connected with the port on the digital camera, the connector-cable links the digital camera with the processing device.

4. The digital camera of claim 3, wherein the removable cover pivots about a hinge to move between the closed state and the open state.

5. The digital camera of claim 3, wherein, in the third and fourth states, the first connector has (i) a connected state in which the first connector is connected to the processing device and (ii) a disconnected state in which the first connector is not connected to the processing device.

6. The digital camera of claim 3, wherein the first connector is selected from the group consisting of (i) a USB connector, (ii) an IEEE 1394 connector and (ii) an RS-232 connector.

7. The digital camera of claim 3, wherein the processing device is selected from the group consisting of (i) a wireless communication device and (ii) a personal computer.

8. The digital camera of claim 3, wherein:
    in the digital camera's first and second states, at least the first connector resides within the cable-connector storage portion;
    in the cable camera's third and fourth states, the first connector is outside of the cable-connector storage portion.

9. The digital camera of claim 3, wherein the camera-housing defines a main outer surface and a cover outer surface; and when the removable cover is in the closed state, the main outer surface is substantially continuous with the cover outer surface.

10. The digital camera of claim 3, wherein the camera-housing defines an outer surface, the outer surface defining a lens opening at the camera portion.

11. The digital camera of claim 10, further comprising (i) a lens at the lens opening, for receiving light defining images and (ii) data storage for storing digital representations of the images.

* * * * *